3,213,131
FILTRATION OF PETROLEUM SULFONATE PRODUCT
Bruce C. Benedict, Bartlesville, Okla., assignor to Phillips Petroleum Company, a corporation of Delaware
Filed July 17, 1961, Ser. No. 124,535
7 Claims. (Cl. 260—504)

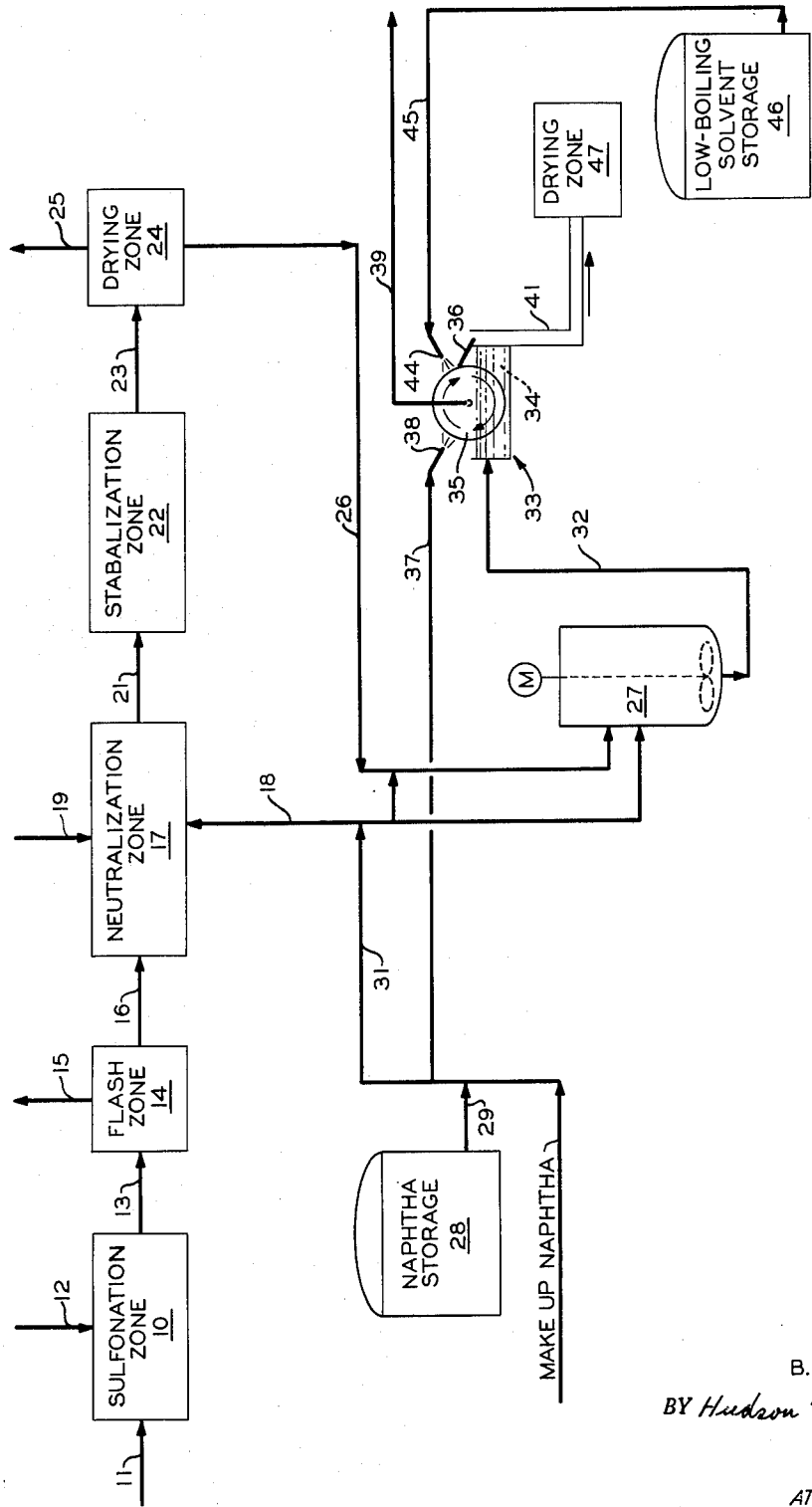

This invention relates to a filtration process. In one aspect, it relates to the recovery of calcium petroleum sulfonates from a sulfonation reaction product containing such sulfonates. In still another aspect, it relates to a method for improving the handling properties of the filter cake obtained in the filtration of calcium petroleum sulfonate-containing mixtures and for the recovery of additional quantities of calcium petroleum sulfonate over that normally obtained in the processes heretobefore practiced.

Meta petroleum sulfonates are widely used in the manufacture of lubricating oil additives and greases. Recently a process has been developed for the manufacture of superior metal petroleum sulfonates, particularly calcium petroleum sulfonates, by the sulfonation of a highly viscous, highly refined paraffinic oil fraction having a viscosity of at least about 200 to 230 SUS at 210° F. and having a viscosity index of about 85 to 100 or higher. In the production of these high molecular weight calcium petroleum sulfonates the oil is sulfonated with a sulfonation agent such as fuming sulfuric acid, chlorosulfonic acid, mixtures of chlorosulfonic acid and sulfur trioxide, sulfur trioxide dissolved in liquid sulfur dioxide, and other similar sulfonating agents. No separate sludge phase is produced when these high molecular weight, high viscosity oils are sulfonated and therefore the total reaction product, except for any excess sulfonating agent which can be recovered, is neutralized with an aqueous slurry of a metal hydroxide such as calcium hydroxide (lime) so as to convert simultaneously the sulfonic acids to the corresponding metal petroleum sulfonate and to neutralize all of the inorganic acids in the reaction product. An excess of metal hydroxide is used and it is necessary to remove metal hydroxides and other solid materials such as inorganic salts which remain in the reaction product following the neutralization step. These solids ordinarily are removed in a filtration step and the separation of the lime-neutralized sulfonation mixture, by filtration, is the primary concern of this invention.

It is the usual practice to dilute the reaction product with an inert solvent prior to neutralizing the sulfonic acids produced so as to facilitate handling the product. It is also the usual practice to wash the filter cake with a quantity of naphtha prior to removal of a very thin layer of the filter cake by the doctor knife.

Various proposals have been made for improvements in the step of filtering the slime which constitutes the reaction product of the sulfonation reaction, particularly when employed in conjunction with a continuous precoat filter. Practices such as stabilizing and dehydrating the lime-neutralized sulfonation reaction product under such conditions of temperature and pressure so as to prevent dehydration of calcium sulfonate dehydrate and the addition of a ketone to the metal petroleum sulfonate reaction product prior to filtration have improved the filtration step. It has been found, however, that the filter cake (a mixture of calcium solids, filter aid, and naphtha with or without petroleum sulfonate) removed by the doctor knife, while appearing dry both to sight and touch, if worked slightly or brought into the presence of heat, will form a fluid or semifluid mass somewhat similar to fluid putty and which has a tendency to stick to hot surfaces. Attempts to dry the filter cake have met with little success because the filter cake hardens in the drier and gradually plugs the drier, resulting in a shutdown to clean out the drier and its associated elements.

According to the present invention the filter cake is subjected to the washing action of a low-boiling, inert solvent such as pentane just prior to removal of a layer of filter cake by the doctor knife. This low-boiling, inert solvent wash is in addition to and following the naphtha wash ordinarily applied to the filter cake prior to my invention.

It is an object of the present invention to provide a method for producing a dry filter cake which will not stick to hot surfaces in the filtration of metal petroleum sulfonate product. Another object of this invention is to provide a method for increasing the yield of product in a process for producing metal petroleum sulfonates. Still another object of this invention is to provide a method for increasing the filtration rate for removing inorganic solids from a metal petroleum sulfonate product. It is also an object of this invention to provide a means for washing the filter cake of a precoat filter with a low-boiling solvent prior to removing the filter cake from the filter. Other objects and advantages will be apparent to one skilled in this art upon studying this disclosure, including the detailed description of the invention and the appended drawing wherein:

The sole figure is a schematic flow sheet of the sulfonation process including the filtration step wherein the invention is practiced.

Referring now to the drawing, a feed stock such as a solvent refined, dewaxed lubricating oil fraction derived from a Mid-Continent petroleum, having a viscosity of about 200 to 230 SUS at 210° F. and a viscosity index of 85 to 100 or higher, is introduced to sulfonation zone 10 via conduit 11. Sulfonating agent such as sulfur trioxide dissolved in sulfur dioxide is introduced to sulfonation zone 10 via conduit 12. Reaction products pass via conduit 13 to flash zone 14 where excess sulfonation agent or solvent is removed via conduit 15. The remaining reaction product passes via conduit 16 to neutralization zone 17 wherein it is diluted with a hydrocarbon solvent, such as naphtha, introduced via conduit 18 and is neutralized by a slurry of metal hydroxide, such as an aqueous slurry of lime, introduced via conduit 19. The resulting substantially neutralized slurry of calcium sulfate and calcium hydroxide in water and diluted sulfonation reaction effluent is passed via conduit 21 to stabilization zone 22 wherein the reaction product is maintained in the presence of the metal hydroxide at elevated temperature and elevated pressure so as to stabilize the same with respect to ferrous corrosion as determined in the total base number of the mixture. The total base number is a measure of the alkalinity of the neutralized mixture. This is determined by an electrometric titration with 0.1 normal hydrochloric acid to a pH of 4.0 and then conversion of the value to that of potassium hydroxide. In order to be satisfactory a value in excess of 7.8 mg. of potassium hydroxide per gram of sample should be obtained. The stabilized reaction product is then passed via conduit 23 to drying zone 24 where substantially all of the water is removed via conduit 25. The stabilized and dehydrated reaction product is then passed via conduit 26 to filter feed surge tank 27. Additional diluent such as naphtha is passed from naphtha storage 28 via conduits 29 and 31 to conduit 26 or to surge tank 27. The diluted reaction product is passed from surge tank 27 via conduit 32 to filter indicated as 33. Filter 33 is a continuous precoat rotary filter comprising pickup vessel 34, rotary drum 35 and knife 36. The filter surface emerging from the pickup vessel is washed with a spray of naphtha introduced via conduit 37 and spray 38. The filter surface is then washed with a low-boiling, non-polar solvent introduced through spray 44 via conduit 45 from solvent storage 46. Filter cake removed from the surface of filter drum 35 by knife 36 passes to conduit 41 and is introduced to drying zone 47. Filtrate comprising calcium petroleum sulfate and unsulfonated oil is recovered as product via conduit 39. Commercially available driers for drying solids, such as a heated screw-conveyor are suitable for use in the drying zone 47.

In the operation of the invention the naphtha solvent is applied first to the surface of the filter, as practiced heretofore. This is followed by low-boiling solvent wash, which is applied from about 7 to about 20 seconds and preferably about 10 seconds before that portion of the filter surface reaches the doctor knife. The two solvents are employed in a volume ratio of naphtha to low-boiling solvent in the range of about 1:2 to 2:1 and preferably in a ratio of about 1:1, although ratios outside this range can be employed if such is desired. Low-boiling solvent washing is usually preferred at the rate of about 0.01 gallon per square foot of filter surface per revolution, but this rate can be in the range of about 0.004 to about 0.015 gallon per square foot or higher if desired. The wash solvent employed can be recovered and reused by conventional methods.

The following specific example will be helpful in attaining an understanding of the invention but is not to be construed as limiting the invention.

*Example*

The filter unit in a process for producing calcuim petroleum sulfonate from a solvent-refined, dewaxed lubrication oil fraction having a viscosity of about 208 SUS at 210° F. and a viscosity index of about 96 was operated so as to produce a filter cake which appeared dry but could be reduced to a fluid mass by slight working. The filter drum measured 8 feet in diameter, was 16 feet long, and was revolving at 30 r.p.h. The naphtha wash was operating at about 100 gallons per hour and at these conditions an isopentane wash was started at 50 gallons per hour in a spray header located about 2.5 feet ahead of the doctor knife. After 7 minutes operation the filter cake on the conveyor belt exhibited visible improvement as to dryness. After 30 minutes operation, a sample of the filter cake, as removed by the doctor knife, exhibited no stickiness when contacted with hot metal surfaces and displayed no tendency to form a fluid or semifluid mass upon working. The isopentane wash rate was increased to 84 g.p.h. and operation at this rate for an additional period of 30 minutes also produced a filter cake which was dry and non-sticky when worked with a hot metal surface.

In another run the filter was operated with no naphtha or isopentane wash and the filter cake as produced had a muddy appearance and was sticky to the touch and would stick to hot surfaces. The isopentane wash was started at about 100 gallons per hour and after 30 minutes operation a filter cake sample, as removed by the doctor knife, showed some improvement but did not appear dry and had a tendency to stick to hot surfaces. The naphtha wash was then started at about 100 gallons per hour and after 30 minutes operation with both naphtha and isopentane wash the filter cake became quite dry on the conveyor, did not stick to hot surfaces, and did not form a fluid or semifluid mass upon working.

Adding the low boiling solvent to the filter feed instead of as a wash following the naphtha wash did not improve the condition of the filter cake noticeably.

It has been determined that a minimum of about 0.027 gallon of naphtha per square foot of filter surface treated is required to remove the petroleum sulfonate from the filter cake removed from a precoated filter, however such filter cake is still subject to forming a putty-like mass upon being worked and will stick to hot surfaces. It has also been determined that about 0.01 gallon of naphtha per square foot of surface treated, followed by about 0.01 gallon of pentane wash will remove all of the petroleum sulfonate from the filter cake removed by the doctor knife and the filter cake so removed can be reduced to a dry powder in a conventional drier. This shows that a reduction in the total quantity of liquid employed can be realized in addition to a substantial improvement in the properties of the filter cake for further handling of the filter cake.

Naphtha boiling in the range of about 250 to about 300° F. is the preferred filter wash material for use in petroleum sulfonate processes; however, other inert liquid hydrocarbons boiling in the range of about 200 to about 400° F. can be utilized as the primary filter wash medium.

The low boiling solvent utilized as the secondary wash medium, i.e., for the wash which follows the naphtha wash can be any non-polar liquid inert solvent to, and miscible with, the naphtha and which boils slightly above or below ambient or room temperature but below the operating temperature. The solvent should boil at a temperature sufficiently below the drier temperature so that the solvent will be substantially completely evaporated out of the filter cake before the filter cake is subjected to a working action in the drier. The filter drum will ordinarily be operated in the range of about 85 to 175° F. and the drier will ordinarily be operated at a temperature in the range of about 100 to 400° F., depending on the boiling temperature of the low boiling solvent utilized.

Low boiling solvents which can be utilized include paraffin hydrocarbons such as butanes, pentanes and hexanes; olefins such as butenes, pentenes, hexenes; mixtures of the above paraffins and olefins; hydrocarbon derivatives such as propyl chloride; and non-hydrocarbon solvents such as carbon disulfide. Pentanes are the preferred low boiling solvents because of their boiling points and availability.

Although the mechanism of operation of the invention has not been fully established, it is thought that the liquid which normally remains in the filter cake is displaced by the low boiling solvent to a point deeper in the filter cake, or possible through the filter cake. The low boiling solvent then evaporates out of the filter cake substantially immediately after the thin layer of cake is shaved off the surface of the filter. Regardless of the mechanism of operation the discharged cake is dry and crumbly to sight and can be further dried with no tendency to change to the fluid or putty-like form.

If the low boiling solvent wash is applied an excessive period of time prior to removal of the thin layer of filter cake by the knife, the low boiling solvent evaporates completely and the dry surface of the filter cake appears to act as a wick to recontaminate the surface of the filter cake with liquid. It is therefore desirable that the low boiling solvent wash be applied not more than about 20 seconds a head of the doctor knife on a conventional precoat vacuum filter.

The low boiling solvent can be recovered and reused by employing an enclosed filter and an enclosed drier. Enclosed filters and enclosed driers are known and need not be described herein.

That which is claimed is:

1. In the filtration of a slurry of calcium petroleum sulfonates and calcium solids, resulting from neutralization of a petroleum sulfonic acid, with calcium hydroxide, wherein the calcium solids are deposited on a filter medium precoated with a filter aid and the resulting filter cake is washed with naphtha the improvement comprising following the naphtha wash with a wash of a non-polar liquid having a boiling point at about room temperature before removal of the filter cake from the filter medium, so as to remove the naphtha from the filter cake before the filter cake is removed from the filter medium.

2. The process of claim 1 wherein the non-polar liquid is pentane.

3. The process of claim 1 wherein the non-polar liquid is hexane.

4. The process of claim 1 wherein the non-polar liquid is a mixture of butane and hexane.

5. The process of claim 1 wherein the non-polar liquid is butane.

6. In the filtration of a slurry of petroleum sulfonate and calcium solids, resulting from neutralization of a petroleum sulfonic acid with calcium hydroxide, wherein the calcium solids are deposited on a rotary filter precoated with filter aid and the resulting filter cake is washed with naphtha to remove calcium petroleum sulfonate therefrom, the improvement comprising following the naphtha wash with a solvent wash at the rate of about 0.004 to about 0.015 gallon per square foot of filter cake area with a hydrocarbon solvent, boiling at a temperature below that of said naphtha, before the filter cake is removed from the filter.

7. In the preparation of calcium petroleum sulfonate wherein a highly refined paraffinic oil fraction having a viscosity of at least about 200 SUS at 210° F. and a viscosity index of at least about 85 is sulfonated, the resulting sulfonic acid is neutralized with calcium hydroxide, calcium solids are removed from the sulfonate by means of a filter precoated with filter aid, the filter cake comprising filter aid, calcium solids and sulfonate is washed with naphtha, a layer of filter cake is removed from the filter and dried, the improvement comprising following the naphtha wash with about 0.01 gallon of pentane per square foot of filter cake area before the layer of filter cake is removed; and passing the removed filter cake to a drying step.

References Cited by the Examiner
UNITED STATES PATENTS

| | | | |
|---|---|---|---|
| 746,552 | 12/03 | Moore | 210—396 X |
| 1,659,699 | 2/28 | Oliver | 210—396 X |
| 2,050,007 | 8/36 | Keith et al. | 210—396 X |
| 2,306,074 | 12/42 | Meyer | 210—396 |
| 2,444,466 | 7/48 | Peterson | 210—396 |
| 2,500,056 | 3/50 | Barr | 210—396 X |
| 2,739,982 | 3/56 | Roessler | 260—504 |
| 2,839,194 | 6/58 | Lopker | 210—76 X |
| 2,856,422 | 10/58 | Hutchings | 260—504 |
| 2,857,426 | 10/58 | Hutchings | 260—504 |
| 2,960,233 | 11/60 | Schepman | 210—396 |
| 3,006,952 | 10/61 | Logan | 260—504 |
| 3,023,231 | 2/62 | Logan | 260—504 |
| 3,064,813 | 11/62 | Smith | 210—396 X |

LORRAINE A. WEINBERGER, *Primary Examiner.*

LEON ZITVER, *Examiner.*